(12) United States Patent
Masterson et al.

(10) Patent No.: US 6,957,934 B2
(45) Date of Patent: Oct. 25, 2005

(54) WALLBOARD RASP

(75) Inventors: Jon A. Masterson, Long Beach, CA (US); Timothy J. Florio, Huntington Beach, CA (US)

(73) Assignee: Wallboard Tool Co., Inc., Long Beach, CA (US)

( * ) Notice: Subject to any disclaimer, the term of this patent is extended or adjusted under 35 U.S.C. 154(b) by 89 days.

(21) Appl. No.: 10/309,470

(22) Filed: Dec. 4, 2002

(65) Prior Publication Data

US 2004/0109732 A1   Jun. 10, 2004

(51) Int. Cl.$^7$ .............................................. B23D 71/00
(52) U.S. Cl. .............................. 407/29.15; 15/236.01; 451/524
(58) Field of Search ........................... 407/29.1, 29.11, 407/29.14, 29.15; 15/143.1, 146, 231, 229.13, 15/235.3, 236.01, 236.05, 236.06, 236.08, 15/235.08; 16/422, 430, 436; 451/354, 453, 451/456, 523, 524, 525; D4/130, 137; D32/52; 76/101.1, 119

(56) References Cited

U.S. PATENT DOCUMENTS

| | | | |
|---|---|---|---|
| 2,589,531 A * | 3/1952 | Brooks ......................... 15/231 |
| 4,178,663 A * | 12/1979 | Hayes ..................... 407/29.15 |
| 4,179,779 A * | 12/1979 | Hayes ........................ 409/345 |
| 4,827,706 A | 5/1989 | Meyer et al. |
| 5,227,173 A | 7/1993 | Sherwood |
| 5,823,719 A | 10/1998 | Tyler |
| 5,993,306 A | 11/1999 | McCoy et al. |
| 5,997,221 A * | 12/1999 | Sadler ........................ 407/29.1 |
| 6,093,277 A | 7/2000 | Assink et al. |
| 6,261,031 B1 * | 7/2001 | Stipe et al. ............... 407/29.15 |
| 6,401,757 B1 | 6/2002 | Pentz et al. |
| 6,439,983 B1 | 8/2002 | McCoy et al. |

* cited by examiner

Primary Examiner—Derris H. Banks
Assistant Examiner—Sara Addisu
(74) Attorney, Agent, or Firm—Fulwider Patton Lee & Utecht, LLP

(57) ABSTRACT

A wallboard rasp having an expanded metal blade mounted to a molded plastic handle. The handle is configured with a downwardly-opening receiving groove for receipt of an upwardly-curved perimeter portion of the blade. Sections of the blade's perimeter may be crimped or heat staked within the groove. The groove may be formed between a downwardly-projecting outer lip and one or more downwardly-projecting inner ribs. Where the blade is formed with a substantially planar central portion, the ribs may have substantially planar downwardly-facing surfaces against which the blade's central portion may be supported when mounted on the handle. The grip portion of the handle is configured as a contoured, upwardly-extending body with a base with opposite knurled inset surfaces and a convex top flanged surface with spaced-apart grip ribs.

13 Claims, 3 Drawing Sheets

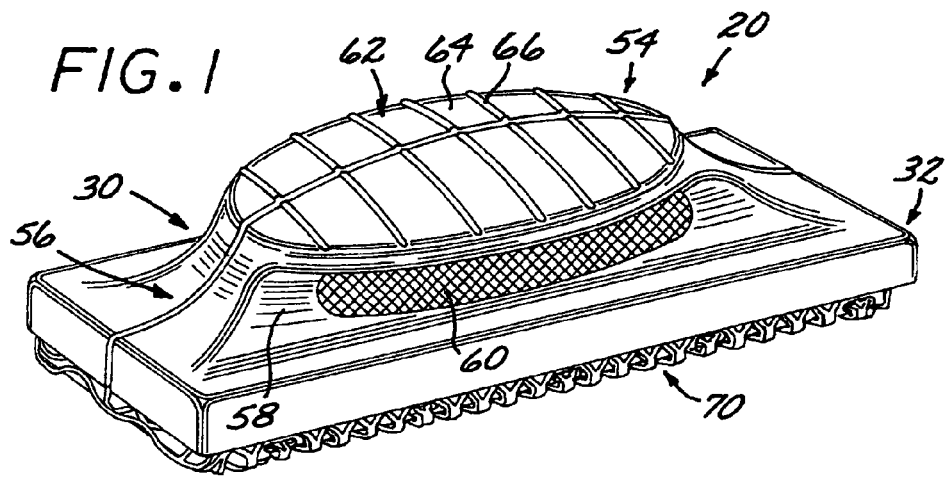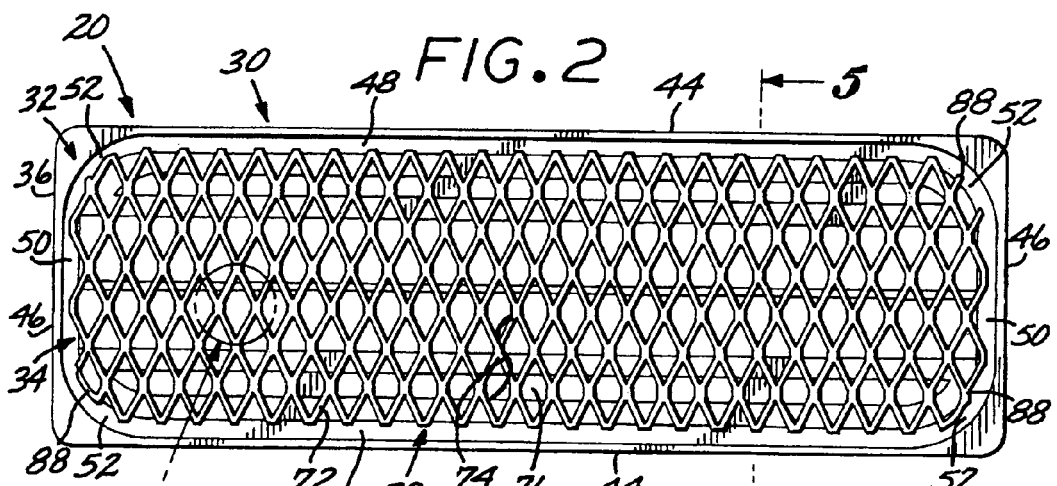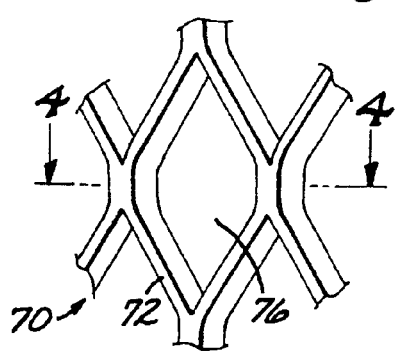

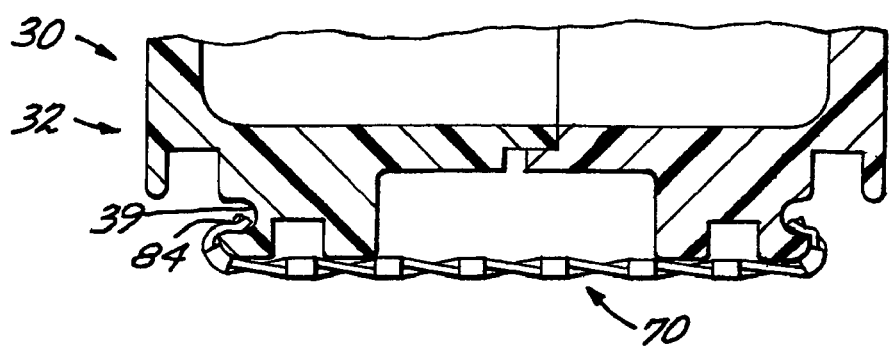
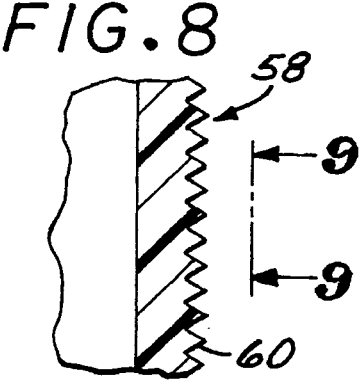
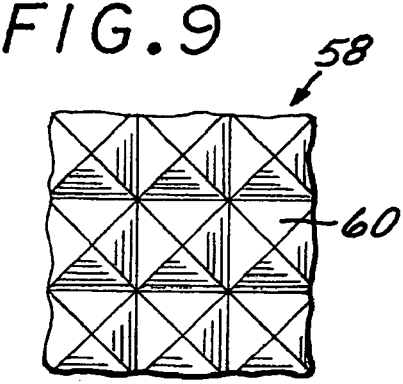
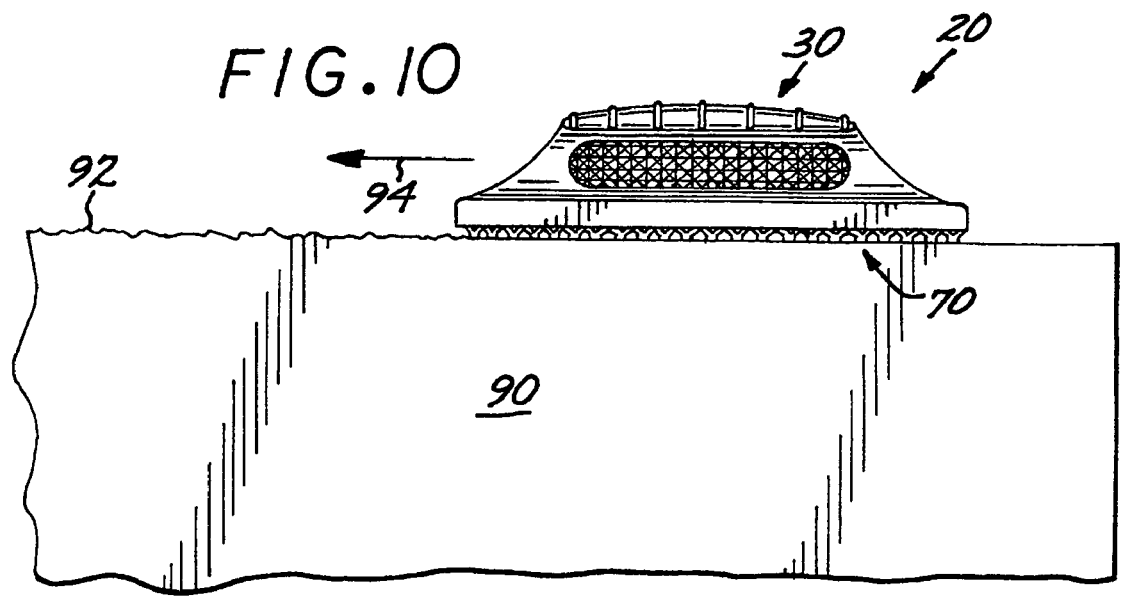

WALLBOARD RASP

BACKGROUND OF THE INVENTION

The present invention relates generally to wallboard tools and specifically to an improved wallboard rasp for reducing and smoothing the edges of wallboard material.

It is well known in the art of building construction to employ gypsum board, or wallboard, in forming the interior wall and ceiling surfaces of a building. Such wallboard material is typically supplied in large sheets which must often be cut to size in order to position the wallboard properly at corner joints and around doors, windows, and wall and ceiling fixtures. Because a close abutment fit is desirable between the piece of cut wallboard and the adjacent wallboard or other obstruction, those skilled in the art will typically cut the fitted piece to a size slightly larger than the opening in which the piece is to be installed and then reduce the piece's size along one or more of its cut edges until a flush fit is achieved.

As is also known and widely used in the art, a wallboard rasp may be employed by the artisan in reducing a wallboard piece's size smoothly and uniformly. The conventional rasp consists essentially of an abrasive blade mounted on a handle configured for grasping the rasp and repeatedly forcing the blade over the edge that is to be reduced so as to remove wallboard material until the desired dimension is attained. The blade typically is formed from an expanded metal sheet having a pattern of generally hexagonal openings separated by interconnected metal wires with sharp outer edges designed for abrading and removing the wallboard material. Moreover, sharp edges are often created about the perimeter of the metal sheet when the sheet is cut or otherwise configured to the desired size to be mounted on a rasp handle for use.

Due to the many sharp edges associated with the rasp blade and the impracticality of holding the blade itself to work on a piece of wallboard, various handle configurations have been employed in the art to secure the blade and facilitate its use. Specifically, to allow the necessary exposure to the sharp wires of the blade's metal sheet while protecting the artisan from unneeded risks of injury from the blade, handles have been implemented that enclose at least a portion of the blade, including the blade perimeter, such that the handle may be grasped by the artisan without coming into contact with the blade. While these prior art wallboard rasps then serve their intended purpose, they do not optimally house the blade for both effective and safe use. Rather, the materials and methods of manufacture employed in prior art rasps have resulted in a relatively bulky and more costly tool. Further, the handles are often configured as elongate bodies that are not conducive to obtaining a good grip on the rasp during use.

Thus, there still exists a need in the art for a wallboard rasp having a handle and blade combination configured for efficient, safe use and for improved manufacturability. The present invention fulfills these needs and others.

SUMMARY OF THE INVENTION

The wallboard rasp of the present invention generally includes an expanded metal blade mounted to a molded plastic handle. The handle is configured with a mounting portion having a downwardly-opening receiving groove for receipt of an upwardly-curved perimeter portion of the blade. Because the blade has sharp edges about its perimeter, the groove is formed so as to substantially enclose the free sharp ends of the blade and thereby prevent inadvertent cuts to the worker during use of the rasp. The groove may be formed between a downwardly-projecting outer lip and one or more downwardly-projecting inner ribs so as to be continuous about the handle's underside mounting portion. Also, the corners of the groove and blade perimeter may be rounded to further eliminate dangerous sharp edges on the blade. Where the blade is formed with a substantially planar central portion, the ribs may have substantially planar downwardly-facing surfaces against which the blade's central portion may be supported when mounted on the handle. A lengthwise recess between adjacent ribs provides clearance for cut wallboard material to pass through the blade during use.

The grip portion of the rasp's handle is configured as a contoured, upwardly-extending body having a vertical base projecting from the mounting portion of the handle and terminating in a horizontal flange. Opposite sides of the base may be formed with knurled inset surfaces and the flange may be configured as a convex surface with spaced-apart grip ribs. The insets on the base and the rounded, ribbed upper surface of the flange cooperate to provide a contoured, comfortable, easy to grip handle so that a worker can maintain an effective and safe grasp on the wallboard rasp during use. Due to the configuration of the handle, it may be injection molded so as to yield a rasp according to the present invention that is both safe and functional, and also sturdy, lightweight and cost-effective to manufacture.

These and other features and advantages of the present invention will become apparent from the following detailed description of a preferred embodiment which, taken in conjunction with the accompanying drawings, illustrates by way of example the principles of the invention.

BRIEF DESCRIPTION OF THE DRAWINGS

FIG. 1 is a perspective view of an exemplary embodiment wallboard rasp according to the present invention, generally including a molded handle and an expanded metal blade;

FIG. 2 is a bottom view of the wallboard rasp of FIG. 1 showing the blade mounted on the underside of the handle;

FIG. 3 is an enlarged partial view of the wallboard rasp blade taken from circle '3' of FIG. 2;

FIG. 7 is a cross-sectional view of the wallboard rasp of FIG. 1 taken along line 7—7 of FIG. 6;

FIG. 8 is a cross-sectional view of the rasp handle taken along line 8—8 of FIG. 5, showing the profile of the knurling;

FIG. 9 is a front view of the rasp handle knurling taken along line 9—9 of FIG. 8; and FIG. 10 is a side view of the wallboard rasp of FIG. 1, in reduced scale, as in use on a wallboard piece to smooth a cut edge.

DETAILED DESCRIPTION OF THE PREFERRED EMBODIMENTS

Figure 4:
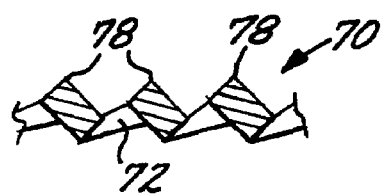
FIG. 4 is a broken cross-sectional view of the wallboard rasp blade taken along line 4—4 of FIG. 3.

Referring to the drawings, FIG. 1 shows a perspective view of an exemplary embodiment wallboard rasp 20 of the present invention. The rasp generally includes a molded handle 30 and an expanded metal blade 70 mounted thereon for convenient and safe use of the rasp in reducing and smoothing cut wallboard edges. As discussed in more detail below, the handle has a lower mounting portion 32 configured about its perimeter to receive and enclose the edges 86 (FIG. 5) of the blade and an upper grip portion 54 contoured to provide a comfortable, secure grip on the rasp during use.

Turning now to FIG. 2, a bottom view of the wallboard rasp 20 shows the expanded metal blade 70 mounted on the underneath, downwardly-facing side of the handle 30. The blade is shown as being formed from a pattern of intersecting metal strips 72 defining a lattice 74 with generally hexagonal openings 76 throughout. This construction allows the blade to be shaped and sized so as to have a perimeter essentially corresponding to that of the handle 30. As such, and as explained further below, a downwardly-opening receiving groove 34 is formed in the handle's lower mounting portion 32 for safe and secure receipt of the blade perimeter.

As shown in FIGS. 3 and 4, and as known in the art, the intersecting metal strips 72 of the expanded metal blade 70 may be formed as a continuous pattern from a single sheet of metal by cutting a series of spaced-apart slits throughout the sheet and then pulling the sheet in a direction normal to the slits to essentially deform the slits into the hexagonal openings 76. In so doing, the blade is formed as a symmetrical latticework 74. Further, as is also known, pulling the slitted sheet to form the hexagonal openings also causes the metal strips to twist somewhat out of the plane of the blade to form downwardly-protruding blade cutting edges 78. The cutting edges are sharp so as to cut and abrade the rough, cut wallboard edges 92 (FIG. 10) when the rasp is passed over the edges in order to smooth and reduce them to the desired dimension. Thus, the worker manipulating the rasp during use is exposed to the risk of cutting himself as well and must be careful. Relatedly, because the blade is often formed from a large continuous sheet as described above and then cut and shaped to the desired configuration to be mounted on the handle, the edges 86 (FIG. 5) of the blade are also sharp and may present further risks of inadvertent cuts and abrasions to the worker if not effectively enclosed. The present invention addresses this concern in a convenient to use and efficiently manufactured wallboard rasp.

Figure 5:
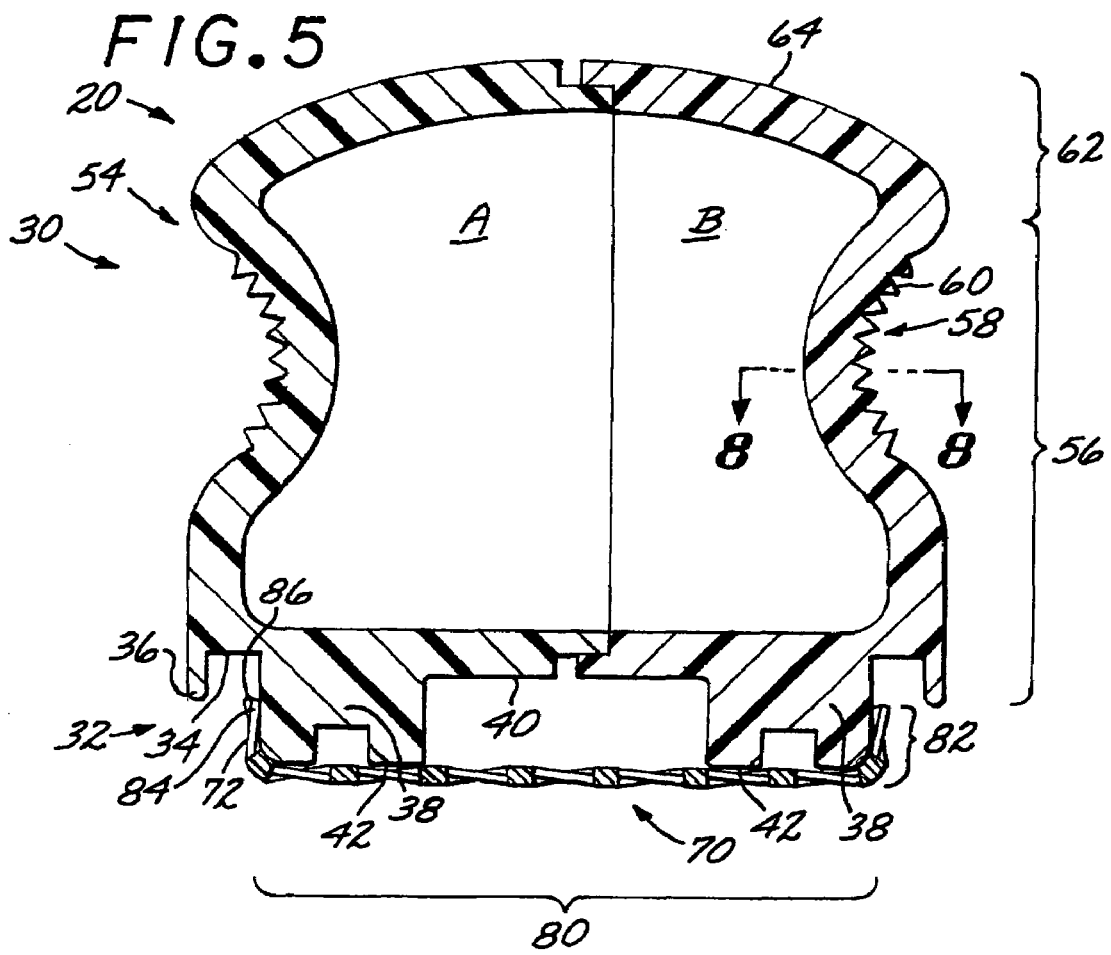
FIG. 5 is an enlarged cross-sectional view of the wallboard rasp of FIG. 1 taken along line 5—5 of FIG. 2.

Referring now to FIG. 5, there is shown a cross-sectional view of the wallboard rasp 20 of the present invention, showing the expanded metal blade 70 mounted on the handle 30. As shown in FIG. 2, the handle's lower mounting portion 32 is configured with a downwardly-opening receiving groove 34 into which the blade is installed. In the exemplary embodiment, the groove is defined by a downwardly-projecting outer lip 36 and a pair of downwardly-projecting inner ribs 38, so that the groove is effectively formed between the lip and the ribs. The blade is then formed having a substantially planar central portion 80 and an upwardly-curved perimeter portion 82 about the central portion configured to be at least partially received within the receiving groove to mount the blade on the handle. Specifically, as shown, the free ends 84 of the blade's metal strips 72, which together define the perimeter edge 86 of the blade, are safely enclosed by the lip. In this way, it will be appreciated that the outer lip serves to retain and shield the perimeter portion of the blade so as to prevent inadvertent separation of the blade from the handle and to avoid the risk of injury from outwardly-protruding, exposed blade edges. Those skilled in the art will appreciate that other blade profiles and contours may be employed in conjunction with the wallboard rasp of the present invention so as to still provide protection from the sharp edges of the blade's perimeter while configuring the blade's central portion to smooth and reduce other edge geometries.

With continued reference to FIG. 5, the ribs 38 of the handle 30's mounting portion 32 are configured as being parallel and offset so as to form a lengthwise channel or recess 40 between the two ribs. The downwardly-facing surfaces 42 of the ribs are substantially planar so as to generally engage and support the central portion 80 of the blade 70 while allowing wallboard material cut from an edge 92 (FIG. 10) being reduced or smoothed to pass through the blade and into the recess so as to not impair the further cutting action of the blade as it is passed repeatedly over the wallboard edge.

Referring again to FIG. 2, in the exemplary embodiment of the wallboard rasp 20 of the present invention, the overall profile of the rasp is essentially rectangular, so that the handle has opposite handle sides 44 and opposite handle ends 46. The receiving groove 34 is continuous about the mounting portion 32 so as to have side groove portions 48 and end groove portions 50 corresponding to and inset from the respective handle sides and ends. The side and end groove portions intersect in rounded groove corners 52 to complete the groove profile. As such, the upwardly-curved perimeter portion 82 (FIG. 5) of the blade 70 may also be configured with rounded blade corners 88 so that the blade substantially conforms to the receiving groove about its entire perimeter. It will be appreciated by those skilled in the art that such conformance of the blade to the handle's mounting portion will further insure the assembly's integrity and protect against injury through exposed sharp edges of the blade. Specifically, the rounded blade corners form a more blunt blade profile that is less likely to have inadvertent protruding sharp edges that could cut a worker while using the rasp.

Figure 6:
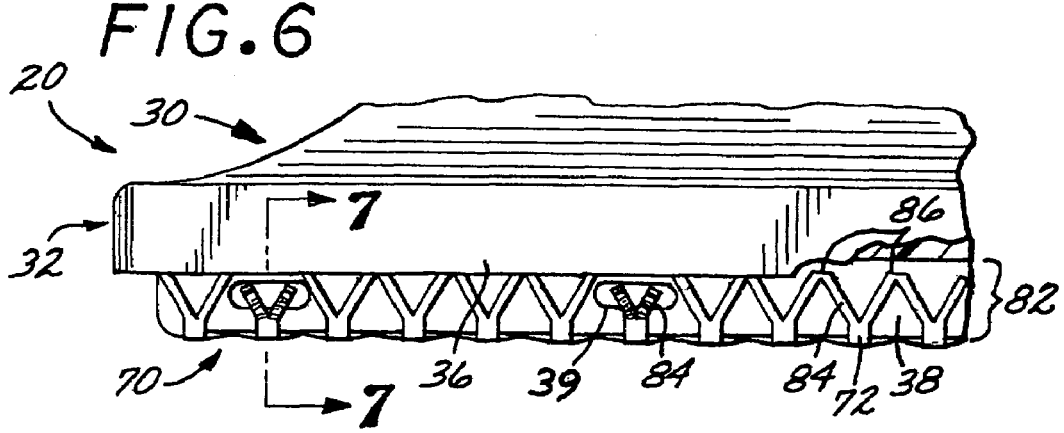
FIG. 6 is a broken side view of the wallboard rasp of FIG. 1, partially in section, showing the perimeter of the blade captured within the handle's receiving groove and sections of the blade perimeter staked to the handle.

Turning now to FIG. 6, there is shown a partial side view of the wallboard rasp 20 of the present invention with a portion of the outer lip 36 cut away to reveal a full section of the perimeter portion 82 of the blade 70. As can be seen, the free ends, or tines, 84 that extend generally upwardly against the rib 38 to form the blade's perimeter portion may intersect or cross at the perimeter edge 86. The cooperation of the tines gives the perimeter of the blade integrity and reduces the chance that a single tine could somehow be displaced from within the groove and present a risk of injury. Again, because these perimeter edges extend within the lip of the handle 30's lower mounting portion 32, the sharp edges about the blade's perimeter are concealed and the risk of an inadvertent cut or abrasion to a worker from a perimeter edge of the blade during use or handling of the rasp is all but eliminated in the present design.

Referring now to FIGS. 6 and 7, one or more of the tines 84 forming the upwardly-curved perimeter portion 82 of the expanded metal blade 70 may be deflected inwardly against an inner rib 38. Hence, the friction between the engaged surfaces as a result of essentially crimping portions of the blade's perimeter onto the ribs will serve to secure the blade on the handle 30 for safe and effective use in forcibly removing wallboard material from a cut edge. Moreover, as shown, depressions 39 may be formed along the inner ribs at the locations where the blade's perimeter portion is bent inwardly so as to accommodate the deflected tines and provide an inset surface against which the tines can anchor. It will be appreciated by those skilled in the art that the depressions may be heat formed in the ribs at the same time the tines are deflected inwardly so as to permanently heat stake the blade on the handle by causing the melting and flow of material around the tines. It will be further appreciated that a variety of other assembly means now known and later developed in the art can be employed without departing from the spirit and scope of the present invention.

Referring once more to FIGS. 1 and 5, the grip portion 54 of the wallboard rasp 20's handle 30 is generally configured as a contoured, upwardly-extending body formed from a substantially vertical base 56 and a substantially horizontal flange 62. The base projects from the handle's mounting portion and terminates in the grip flange through sloping, curved transition surfaces so as to form a handle that is free of any hard lines or angles and that is aesthetically pleasing. It will be appreciated that such smooth transitions also have the mechanical advantages of creating no stress points that could cause the handle to break, crack or fail during use or if dropped and, as discussed in detail below, providing an ergonomic, comfortable, easy to grip handle.

As best seen in FIG. 5, the vertical base 56 of the grip portion 54 is formed on opposite sides with laterally inset, concave surfaces 58 between the relatively wider lower mounting portion 32 and the outwardly protruding flange 62. These inset surfaces provide a convenient nesting place for the worker's thumb on one side and fingertips on the opposite side to effectively grip the handle 30 of the wallboard rasp 20 during use. Further, the inset surfaces may be formed with knurling 60 to further prevent the handle from slipping from the worker's hand. Enlarged partial cross-sectional and front views of the knurling are shown in FIGS. 8 and 9, respectively, depicting the knurling as diamond-shaped. It will be appreciated that various other knurling configurations can be employed in the present invention as well. Similarly, the handle's generally elliptical top grip surface 64 may be formed with a convex profile and, as shown in FIG. 1, with parallel, spaced apart grip ribs 66 across the width of the grip surface so that the flange fits comfortably in the worker's palm, with the ribs providing additional frictional resistance against the handle slipping out of the worker's hand during use.

From the foregoing description of the exemplary embodiment of the wallboard rasp 20 of the present invention, it will be appreciated that the rasp's handle 30 is well-suited for an injection molding manufacturing process. This permits the use of rigid and semi-rigid thermoplastics known for high impact strength and water resistance in the present design, such as polycarbonate, acrylic, ABS, high density polyethylene, polypropylene and K-resin. To facilitate molding of the desired handle geometry while avoiding overly thick sections that may present problems with sinking, as best shown in FIG. 5, a lengthwise relief slot 43 may be formed in each ribs 38's downwardly-facing support surface 42 to remove unneeded material, thereby reducing the weight and cost of the rasp as well. Further, as also best shown in FIG. 5, to facilitate the injection molding process, the handle may be molded in two substantially symmetrical halves A and B that are then joined in a subsequent operation to form the complete handle. The two halves may be assembled using a variety of techniques now known or later developed in the art, including an interference- or snap-fit joint, solvent bonding, or ultrasonic welding.

Referring now to FIG. 10, a piece of wallboard 90 is shown as standing upright and as having an upwardly-facing cut edge 92. To reduce and smooth the cut edge to the desired dimension, the wallboard rasp 20 of the present invention is simply grasped about the handle 30 and positioned on the wallboard such that the blade 70 is in contact with the cut edge. Next, with sufficient downward force per the judgment of the worker skilled in the art, the rasp is advanced along the cut edge in the direction of arrow 94 to begin cutting down the high spots on the rough cut edge. This process is then repeated until the desired edge is achieved. It will be appreciated that the contoured handle fits comfortably in the worker's hand and provides an effective grip through the knurled undercuts 58 and the ribbed top surface 64 (FIG. 1), while the downwardly-opening receiving groove 34 and the upwardly-curved blade perimeter portions 82 (FIG. 5) cooperate to secure the blade on the handle and effectively conceal the blade's perimeter edges so as to provide for safe and effective operation. It will also be appreciated by those skilled in the art that the molded plastic handle is relatively low-profile, lightweight and inexpensive, making the wallboard rasp of the present invention more cost-effective and more easily carried in a worker's tool belt or the like.

It should be understood that various modifications and changes may be made with respect to the above-described exemplary embodiment without departing from the scope of the present invention. Accordingly, it is not intended that the invention be limited except by the appended claims.

We claim:

1. A wallboard rasp for smoothing the edges of wallboard material, comprising:
    a molded handle having an upper grip portion and a lower mounting portion, the mounting portion being configured with a downwardly-opening receiving groove therein; and
    an expanded metal blade having a central portion and an upwardly-curved perimeter portion extending therefrom and configured to be received within the receiving groove to mount the blade on the handle, the receiving groove at least partially shielding the perimeter portion so as to eliminate unwanted outwardly-protruding blade edges.

2. The wallboard rasp of claim 1, wherein:
    the perimeter portion terminates in an upwardly-facing perimeter edge; and
    the mounting portion is further configured with a downwardly-projecting outer lip and at least one downwardly-projecting inner rib so as to form the receiving groove therebetween, whereby the outer lip encloses the perimeter edge of the blade.

3. The wallboard rasp of claim 2, wherein:
    the mounting portion is configured with two adjacent inner ribs each having a substantially planar downwardly-facing support surface, the ribs forming therebetween a lengthwise downwardly-opening recess; and
    the central portion of the blade is substantially planar and configured to seat on the support surfaces and span the recess so as to be supported while allowing wallboard material to pass through the blade and into the recess during use.

4. The wallboard rasp of claim 1, wherein:
    the receiving groove is continuous about the perimeter of the mounting portion of the handle; and
    the perimeter portion is continuous about the central portion so that the entire perimeter of the blade is secured within the handle.

5. The wallboard rasp of claim 1, wherein:
    the expanded metal blade is configured from a lattice of intersecting metal strips so as to form generally hexagonal openings therebetween, the perimeter portion of the blade being formed from tines defined by upwardly-projecting portions of the strips.

6. The wallboard rasp of claim 4, wherein:
one or more of the tines are deflected inwardly to mount the blade on the handle.

7. The wallboard rasp of claim 6, wherein:
depressions are heat formed in the mounting portion as the tines are deflected inwardly so as to permanently heat stake the blade on the handle.

8. A wallboard rasp for smoothing the edges of wallboard material, comprising:
a molded handle having an upper grip portion and a lower mounting portion, the mounting portion being configured with a downwardly-opening receiving groove therein; and
an expanded metal blade having a central portion and an upwardly-curved perimeter portion extending therefrom and configured to be received within the receiving groove to mount the blade on the handle, the receiving groove at least partially shielding the perimeter portion so as to eliminate unwanted outwardly-protruding blade edges;
the handle is substantially rectangular so as to have opposite handle sides and opposite handle ends;
the receiving groove is continuous about the mounting portion so as to be configured with side groove portions inset from the handle sides and end groove portions inset from the handle ends, the side groove portions and end groove portions intersecting in curved groove corners altogether defining a groove profile; and
the perimeter portion of the blade defines a blade profile corresponding to the groove profile.

9. The wallboard rasp of claim 8, wherein:
the handle is formed from two substantially symmetrical halves that are assembled together.

10. The wallboard rasp of claim 8, wherein:
the grip portion is configured as a contoured, upwardly-extending body formed by a substantially vertical base projecting from the mounting portion and terminating in a substantially horizontal flange, the flange being configured to protrude laterally beyond opposite sides of the base so as to form opposite inset surfaces on the base.

11. The wallboard rasp of claim 10, wherein:
the opposite inset surfaces of the base are knurled.

12. The wallboard rasp of claim 10, wherein:
the flange is formed having a substantially elliptical top profile and a convex upwardly-facing grip surface; and
parallel, offset grip ribs are formed along the grip surface.

13. A wallboard rasp, comprising:
a molded handle having an upper grip portion and a lower mounting portion, the grip portion being configured as a contoured, upwardly-extending body with opposite knurled inset surfaces, the mounting portion being configured thereabout with a substantially continuous downwardly-projecting outer lip and with two offset downwardly-projecting inner ribs so as to form a downwardly-opening receiving groove between the lip and the ribs and a downwardly-opening recess between the ribs; and
an expanded metal blade having a substantially planar central portion and an upwardly-curved perimeter portion terminating in an upwardly-facing perimeter edge, the blade being formed from a lattice of intersecting metal strips so as to form generally hexagonal openings therebetween, the perimeter portion of the blade being formed from tines defined by upwardly-projecting portions of the strips and configured to be received within the receiving groove and at least partially deflected thereagainst to mount the blade on the handle, the inner ribs of the mounting portion supporting the central portion of the blade and the outer lip of the mounting portion enclosing the perimeter edge so as to eliminate unwanted outwardly-protruding blade edges.

* * * * *